(12) United States Patent
DeLack (10) Patent No.: US 7,794,177 B2
(45) Date of Patent: Sep. 14, 2010

(54) STAB AND HINGE-OVER PIPELINE AND TERMINAL ASSEMBLY

(76) Inventor: Kristen DeLack, 10631 Inwood Dr., Houston, TX (US) 77042

( * ) Notice: Subject to any disclaimer, the term of this patent is extended or adjusted under 35 U.S.C. 154(b) by 69 days.

(21) Appl. No.: 12/120,855

(22) Filed: May 15, 2008

(65) Prior Publication Data

US 2008/0286050 A1 Nov. 20, 2008

Related U.S. Application Data

(60) Provisional application No. 60/938,530, filed on May 17, 2007.

(51) Int. Cl.
*F16L 1/12* (2006.01)
(52) U.S. Cl. ..................... 405/172; 405/169
(58) Field of Classification Search ............. 405/172, 405/170, 169, 168.1, 158, 184.4, 224.2, 224.3, 405/227
See application file for complete search history.

(56) References Cited

U.S. PATENT DOCUMENTS

| | | | |
|---|---|---|---|
| 4,230,186 A | 10/1980 | Lewis, Jr. | |
| 4,541,753 A | 9/1985 | Langner | |
| 4,580,636 A * | 4/1986 | Johnson et al. | 405/169 |
| 4,676,696 A | 6/1987 | Laursen | |
| 4,717,287 A | 1/1988 | Laursen | |
| 4,877,356 A | 10/1989 | Bontenbal | |
| 4,906,137 A * | 3/1990 | Maloberti et al. | 405/170 |
| 5,320,175 A | 6/1994 | Ritter et al. | |
| 5,722,796 A | 3/1998 | Halvorsen et al. | |
| 6,109,830 A * | 8/2000 | de Baan | 405/170 |
| 6,409,428 B1 * | 6/2002 | Moog | 405/169 |
| 6,742,594 B2 | 6/2004 | Langford et al. | |
| 6,854,930 B2 * | 2/2005 | Pionetti | 405/172 |
| 7,025,535 B2 * | 4/2006 | Chiesa et al. | 405/169 |
| 7,040,841 B2 * | 5/2006 | Kelm et al. | 405/224.2 |
| 2003/0086763 A1 * | 5/2003 | Hooper et al. | 405/224.4 |

(Continued)

FOREIGN PATENT DOCUMENTS

| | | |
|---|---|---|
| FR | 2859495 | 3/2005 |
| WO | WO 2006 134456 | 12/2006 |

OTHER PUBLICATIONS

PCT, International Search Report, Oct. 17, 2008, 1-15.
International Search Report from PCT/US2008/063574, mailed Nov. 26, 2009.

*Primary Examiner*—Frederick L Lagman
(74) *Attorney, Agent, or Firm*—Christopher D. Northcutt (57) ABSTRACT

A subsea system for securing an end portion of a pipeline includes a subsea foundation. The foundation has a lower portion located below the sea floor and an upper portion extending above the sea floor. The subsea foundation has a receptacle formed in the upper portion. The system includes a base frame that lands on the subsea foundation. The base frame has a track formed therein. A stab is hingedly mounted to the base frame. The stab stabs into the receptacle to secure the base frame to the subsea foundation. A sliding mechanism is carried by the base frame and moves along the track. The sliding mechanism is connected to a segment of the pipeline extending along the sea floor. A terminal assembly for an end portion of a pipeline and a method for securing an end portion of a pipeline are also included herein.

24 Claims, 9 Drawing Sheets

U.S. PATENT DOCUMENTS

2004/0226722 A1 11/2004 Colyer et al.
2005/0196243 A1* 9/2005 Pollock et al. ........... 405/224.3
2005/0271476 A1* 12/2005 Chiesa et al. ............... 405/172
2008/0193219 A1 8/2008 Luppe et al.

* cited by examiner

STAB AND HINGE-OVER PIPELINE AND TERMINAL ASSEMBLY

CROSS-REFERENCE TO RELATED APPLICATIONS

This application claims the benefit of U.S. Provisional Application No. 60/938,530, filed May 17, 2007.

BACKGROUND OF THE INVENTION

1. Field of the Invention

This invention relates in general to the conveyance of hydrocarbons from a subsea well or wells, and in particular to an apparatus and assembly, and methods associated therewith, for a pipeline end terminal and foundation assembly for a subsea pipeline.

2. Background of the Invention

When conveying hydrocarbons from a subsea well, the hydrocarbons are often communicated through a flowline extending along the surface of the sea floor. The flowline extends from a single subsea wellhead, from subsea processing equipment, or from a subsea collection manifold.

The flowline or pipeline often expands and contracts due to the heat emitted from the flow of hot hydrocarbons passing through the flowline. The flowline contracts when the flow of the hydrocarbons is stopped. The flowline is also in the contracted state when it is initially installed. Therefore, during operations, the flowline expands to a state that is not experienced during installation and workover operations.

The expansion includes both a radial expansion of the pipeline, as well as a longitudinal expansion of the pipeline. When both of the pipeline ends are secured to fixed locations, such longitudinal expansion causes the middle portion of the pipeline to buckle and drift from its installed position, as well as exerting large forces on the structures at the ends of the pipeline. Such buckling and drift can damage the integrity of the pipeline, as well as the equipment associated with the ends of the pipeline. The expansion is even more significant, and creates larger forces, when the pipeline is extending along the sea floor for deep operations because the pressure and temperature of the surrounding deep water is more extreme than in shallower operations.

In previous assemblies, both ends of the pipeline have been secured to the sea floor, but this results in the problems discussed above. In other assemblies, only one end of the pipeline was secured to the sea floor while the other end was either free to move or was tethered to a foundation structure. Such assemblies alleviated much of the stress forces at the ends of the pipeline, but the end that is not secured tended to drift over a wide range due to the thermal expansion of the pipeline. Such drift makes it difficult for workover operations and for connection of the end of the flowline with other subsea equipment.

SUMMARY OF THE INVENTION

A subsea system for securing an end portion of a pipeline includes a subsea foundation. The foundation has a lower portion located below the sea floor and an upper portion extending above the sea floor. The subsea foundation has a receptacle formed in the upper portion. The system includes a base frame that lands on the subsea foundation. The base frame has a track formed therein. A stab is hingedly mounted to the base frame. The stab stabs into the receptacle to secure the base frame to the subsea foundation. A sliding mechanism is carried by the base frame and moves the track. The sliding mechanism is connected to a segment of the pipeline extending along the sea floor.

The subsea foundation can be a suction pile. The stab can be connected to an end portion of the base frame, and the base frame can pivot about the stab to engage the upper portion of the subsea foundation after the stab stabs into the receptacle. The upper portion of the subsea foundation can include a reinforced section resistant to shear forces. The stabbing of the stab into the receptacle can be for securing the base frame against horizontal movement relative subsea foundation.

In the subsea system, the subsea foundation can also have a foundation deck cantileverly mounted to the upper portion of the subsea foundation. The foundation deck supports at least a portion of the base frame when the base frame lands on the subsea foundation. The base frame can also have a locking mechanism that is selectively extendable into engagement with the foundation deck.

The stab can also be connected to an end portion of the base frame, and the base frame can pivot about the stab so that at least a portion of the base frame engages the foundation deck after the stab stabs into the receptacle. The base frame can also have a locking mechanism that is selectively extendable into engagement with the foundation deck in order to secure the base frame against vertical movement relative to the foundation deck, when the base frame has pivoted about the stab and a portion of the base frame is engaging the foundation deck.

In the subsea system, the sliding mechanism can slide along the track responsive to lateral movements of the pipeline due to heating and cooling of the pipeline.

A terminal assembly for an end portion of a pipeline includes a base frame that is adapted to land onto a subsea foundation. The base frame has a track formed therein. A stab is hingedly mounted to the base, and the stab is adapted to be received within a stab receptacle formed in the subsea foundation. A sliding mechanism is carried by the base frame and moves along the track. The sliding mechanism is adapted to connect to a segment of the pipeline extending along the sea floor, and is adapted to move in response to forces from the pipeline due to heating and cooling of the pipeline.

In the terminal assembly, the track can extend longitudinally relative to the base frame. In the terminal assembly, the base frame can also have a rail with an upward facing surface. The upward facing surface defines a lower portion of the track. In the terminal assembly, the base frame can also include a pair of spaced-apart rails. Each of the rails having an upward facing surface defining a lower portion of the track.

In the terminal assembly, the sliding mechanism can also have a support that slidingly engages the track, and a piping flange positioned thereupon. The piping flange can be adapted to circumferentially extend around the end portion of the pipeline so as to connect the end portion of the pipeline to the sliding mechanism, and to transfer forces from the pipeline to the support to thereby cause the support to slide relative to the track. The sliding mechanism can also have a tower frame and tower flange arrangement extending from the support, which can be adapted to redirect the pipeline from extending substantially horizontally through the pipeline flange to extending substantially vertically when connecting with the tower flange.

In the terminal assembly, the base frame can also have a locking mechanism that is adapted to selectively extend into engagement with the subsea foundation.

In the terminal assembly, the stab can also have a plurality of plates that are outwardly biased and adapted to engage a portion of the interior surface of the stab receptacle when the stab stabs into the stab receptacle in order to resist vertical movement of the stab relative to the stab receptacle.

A method for securing an end portion of a pipeline includes the step of installing a subsea foundation in the a sea floor with a lower portion of the subsea foundation being below the sea floor and an upper portion extending above the sea floor. A stab that is hingedly mounted to the base is stabbed into a receptacle formed in the upper portion of the subsea foundation to secure the base frame to the subsea foundation. A base frame is landed onto the subsea foundation. A sliding mechanism is carried with the base frame, the sliding mechanism moving along a track of the base frame. The sliding mechanism is connected to a segment of a pipeline extending along the sea floor.

The method can also include the step of moving the sliding mechanism in response to forces from the pipeline due to heating and cooling of the pipeline.

In the method, the step of stabbing the stab into the receptacle can also include that the stab is connected to an end portion of the base frame, and the step of landing the base frame can also include hinging-over the base frame about the stab to engage the upper portion of the subsea foundation.

In the method, the step of installing a subsea foundation can also include providing a foundation deck cantileverly mounted to the upper portion of the subsea foundation, and the step of landing the base frame can also include landing at least a portion of the base frame onto the foundation deck.

DETAILED DESCRIPTION OF THE PREFERRED EMBODIMENT

Figure 1:
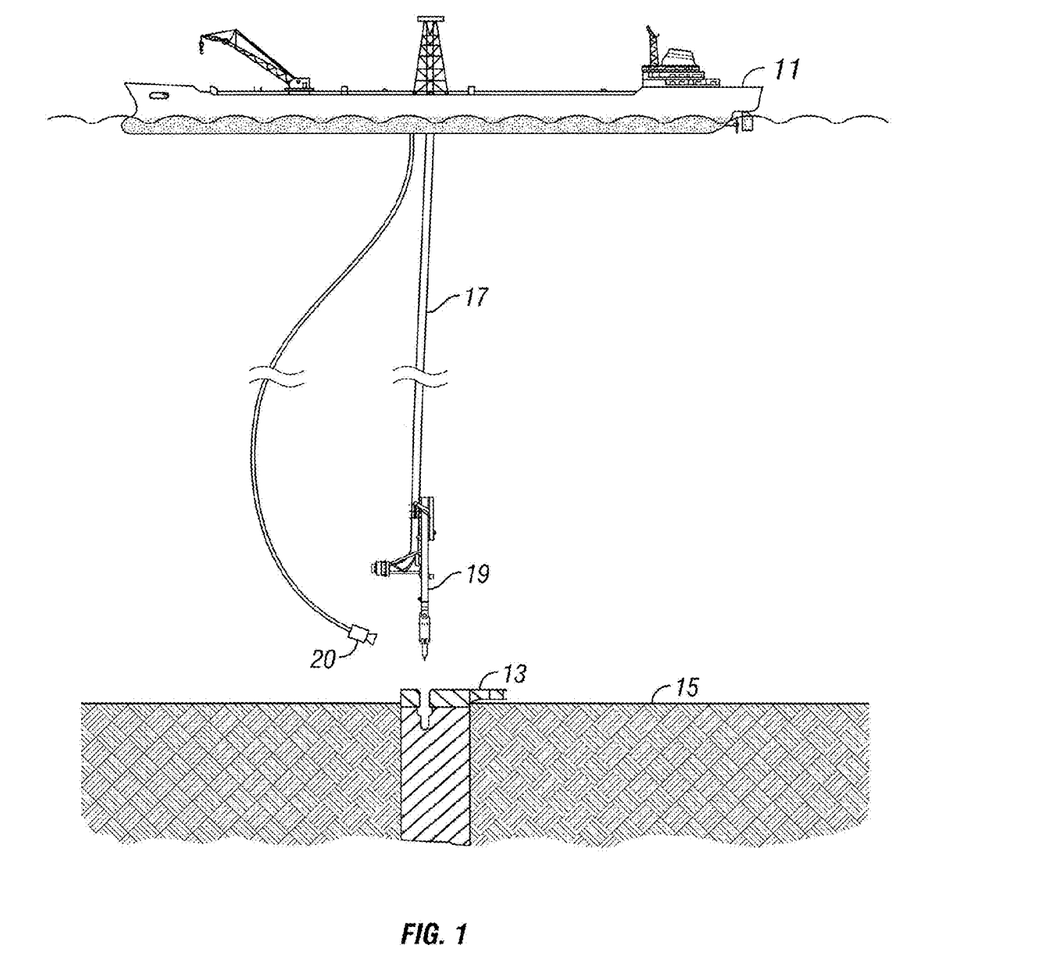
FIG. 1 is a schematic view of a subsea pipeline and pipeline end terminal assembly constructed and being lowered to a subsea foundation in accordance with an embodiment of this invention.

Referring to FIG. 1, an installation vessel 11 sails on the sea surface at a predetermined location above a suction pile or foundation pile 13 attached to the sea floor 15. Foundation pile 13 is preferably embedded into sea floor 15 with an upper portion extending above sea floor 15. Foundation pile 13 preferably extends a predetermined distance into sea floor 15, with a majority of foundation pile 13 being embedded under the mudline, or upper surface, of sea floor 15. By way of example, a typical foundation pile 13 has a length of about seventy-three (73) feet and a diameter of about twelve (12) feet, with at least fifty (50) feet of the length of foundation pile 13 being embedded into sea floor 15. While vessel 11 is illustrated as a "J-Lay" vessel, vessel 11 can also be an "S-lay" vessel or a "REEL" vessel.

A stab and hinge-over pipeline end terminal (PLET) 19 is connected to an end portion of a string of flowline or pipeline 17 to be laid along sea floor 15. As is readily appreciated by those skilled in the art, in a typical pipeline installation, pipeline 17 includes a plurality of pipeline segments that are welded end-to-end as string of pipeline 17 is laid until pipeline 17 is a predetermined length. Pipeline 17 can also be assembled prior to installation according to other methods of laying pipeline 17, for example when a REEL vessel is utilized. In either method, stab and hinge-over PLET 19 is connected to the end portion of pipeline 17 that is to be connected to foundation pile 13, and is typically the end that is lowered first to sea floor 15. As stab and hinge-over PLET 19 approaches foundation pile 13, a remote operated vehicle (ROV) 20 can assist with final alignment of stab and hinge-over PLET 19 with foundation pile 13 as needed.

Figure 2:
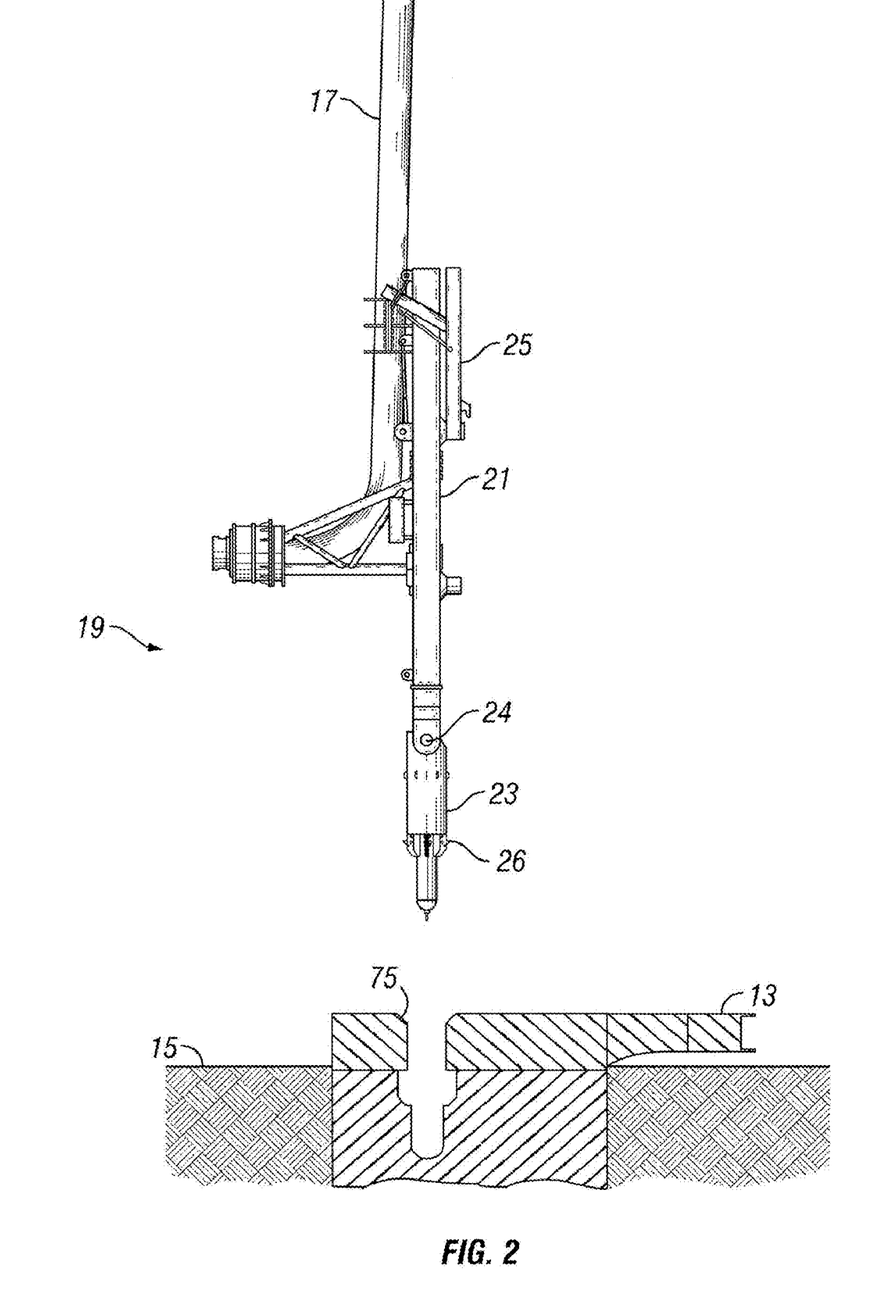
FIG. 2 is an enlarged schematic view of the subsea pipeline end terminal assembly of FIG. 1 approaching the foundation.
Figure 3:
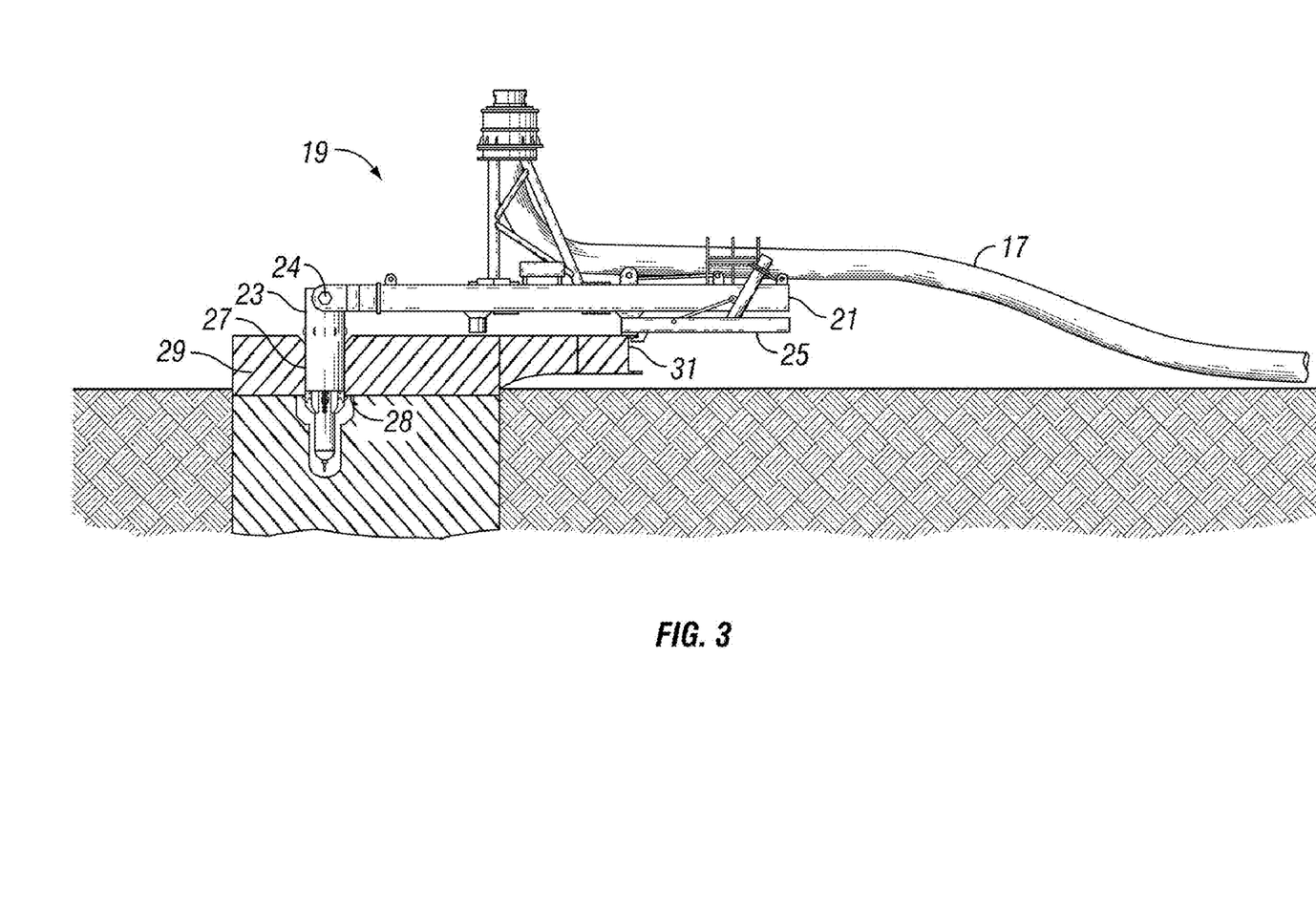
FIG. 3 is an enlarged schematic view of the subsea pipeline end terminal assembly of FIG. 1 connected to the foundation.

Referring to FIGS. 2 and 3, stab and hinge-over PLET 19 has a base frame 21 with a stab 23 attached thereto. In the preferred embodiment, stab 23 is positioned opposite from the end of base frame 21 that receives pipeline 17. Accordingly, as shown in FIG. 2, stab 23 is the leading portion of stab and hinge-over PLET 19 approaching foundation pile 13. In the preferred embodiment, a hinge pin 24 pivotally connects stab 23 to base frame 21 so that base frame 21 can "hinge-over" or hingedly move between a lowering or installation position shown in FIG. 2 to a landed position shown in FIG. 3.

Stab and hinge-over PLET 19 also has a sliding mechanism 25 that is slidingly connected to base frame 21. Sliding mechanism 25 is preferably carried by base frame 21, and slides between the end of base frame 21 receiving pipeline 17 and the end of base frame 21 connected to stab 23. In the preferred embodiment, sliding mechanism 25 engages pipeline 17 so that sliding mechanism 25 moves with pipeline 17 relative to base frame 21 to account for contraction and expansion of pipeline 17. As is readily understood by those skilled in the art, such contraction and expansion is due to the heating of pipeline 17 when warm hydrocarbon fluids are present within pipeline 17, and the cooling of pipeline 17 when hydrocarbon fluids are not present or not warm.

As shown in FIGS. 2-7 and 9A-9C, a plurality of latch plates 26 are positioned circumferentially around a portion of stab 23 that is received within a stab receptacle 27 formed in foundation pile 13. Stab receptacle 27 preferably has an inner bore having a first diameter, and a downward facing shoulder 28 defining a portion of stab receptacle 27 with a larger inner bore having a second diameter. In the preferred embodiment, latch plates 26 are rotatable such that the outermost edge of each latch plate 26 rotates radially inward when entering stab receptacle 27 and engaging the portion of inner bore having the first diameter. Upon passing axially below downward facing shoulder 28, each latch plate 26 rotates radially outward. After such rotation, the upper edge of each latch plate 26 engages downward facing shoulder 28 upon any upward movement of stab 23 relative to stab receptacle 27, thereby resisting further upward movement and the release of stab 23 from within foundation pile 13.

In the preferred embodiment, foundation pile 13 includes a reinforced region or section 29 located toward the upper portion of foundation pile 13. Stab receptacle 27 is preferably formed in reinforced region 29. Reinforced region 29 helps to absorb some of the forces associated with the expansion and contraction of pipeline 17, which are transferred from pipeline 17 through stab and hinge-over PLET 19 to foundation pile 13. Such forces can create tension and compression forces of about 400 KiloPascals. Reinforced region 29 of foundation pile 13 helps to reduce damage to foundation pile 13, particularly at the interaction of stab 23 and stab receptacle 27 due to such forces. A foundation deck 31 also preferably extends radially outward from a reinforced region 29 to increase the effective width of foundation pile 13 for the engagement with stab and hinge-over PLET 19. Foundation deck 31 is discussed in more detail with respect to the discussion of FIGS. 7 and 8.

Figure 4:
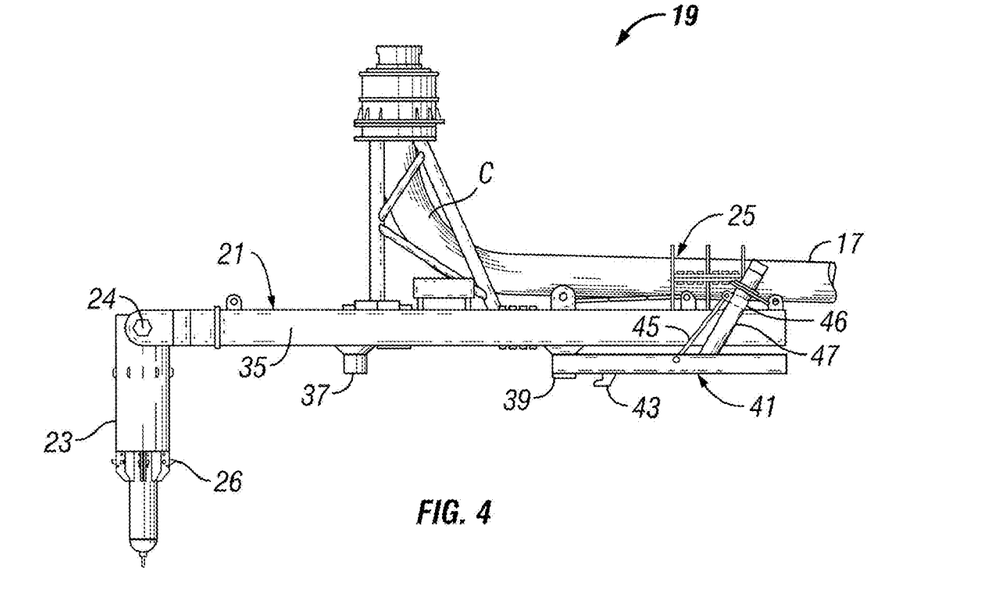
FIG. 4 is a side view of the pipeline end terminal assembly of FIG. 1 with a locking assembly in an open position.
Figure 5:
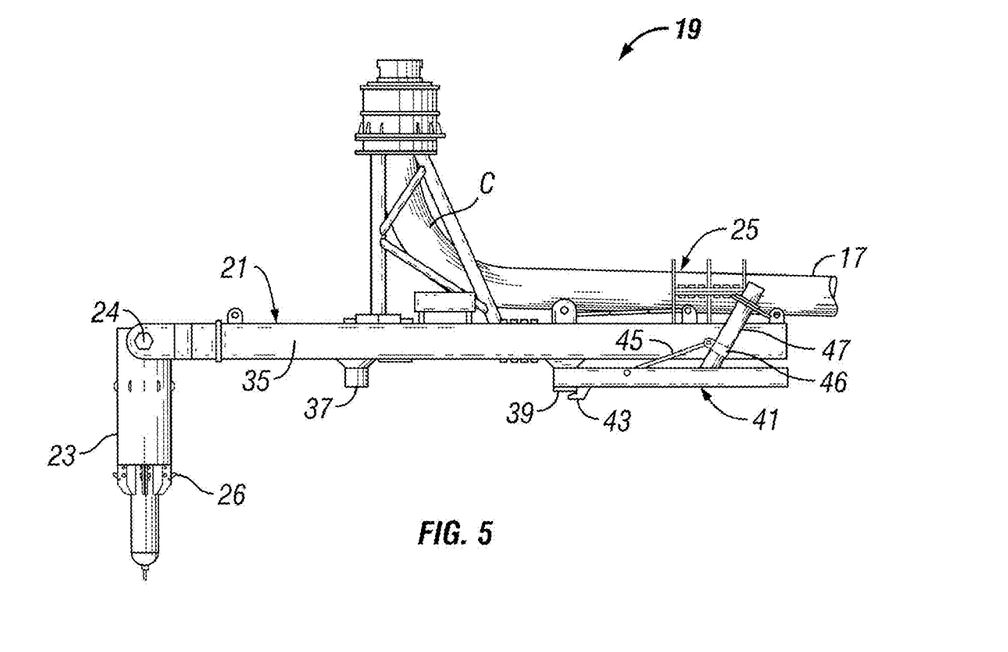
FIG. 5 is a side view of the pipeline end terminal assembly of FIG. 1 with a locking assembly in a closed position.
Figure 6:
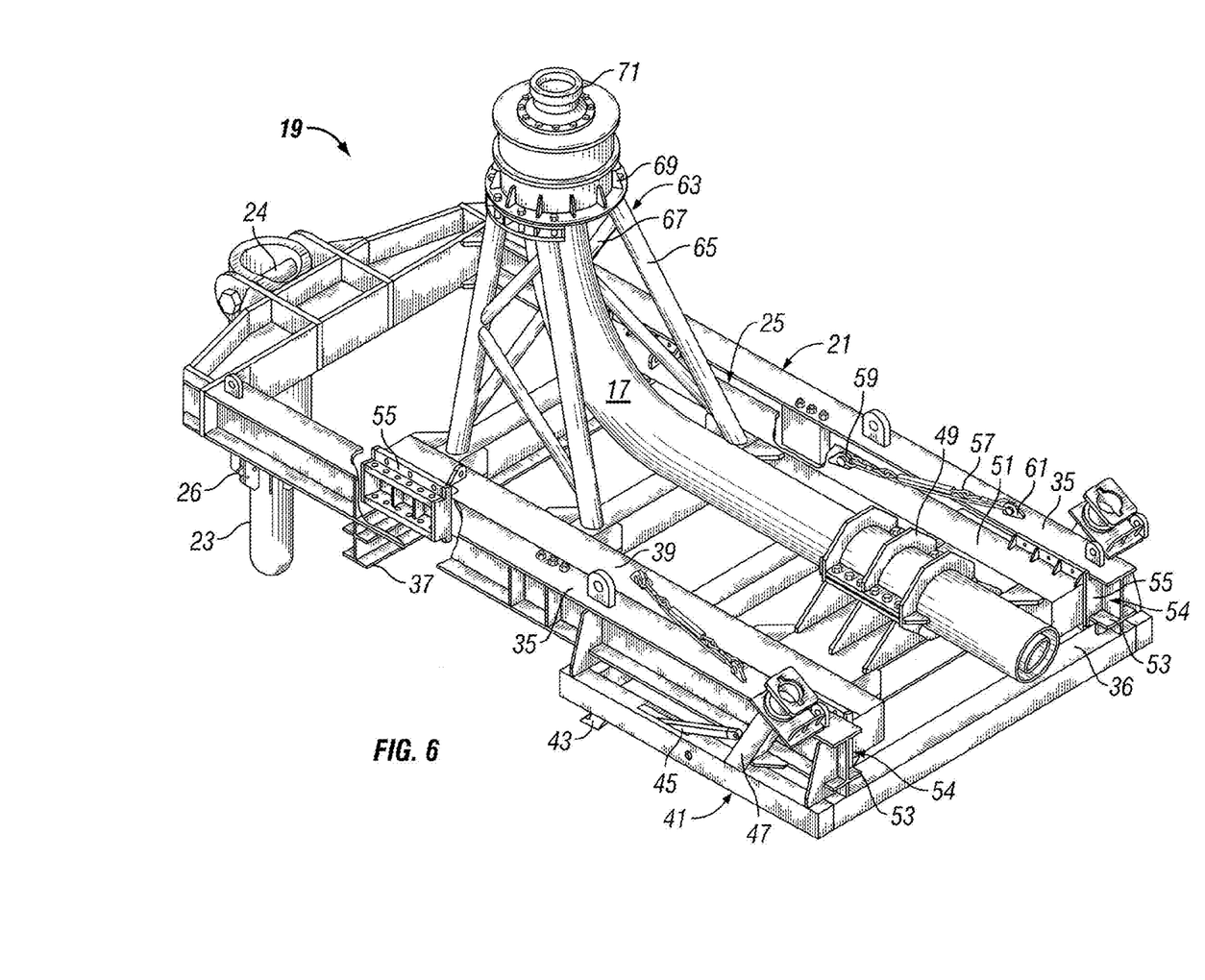
FIG. 6 is a perspective view of the pipeline end terminal assembly of FIG. 1.

Referring to FIGS. 4-6, illustrate an embodiment of stab and hinge-over PLET 19 in more detail. As best shown in FIG. 6, base frame 21 includes at least one beam 35. In the preferred embodiment, base frame 21 has a pair of spaced-apart beams 35 that are connected by a plurality of crossbeams 36. Sliding mechanism 25 is preferably carried between beams 35, above crossbeams 36. Base frame 21 also includes a plurality of supports 37,39 extending below beams 35 for engaging an upper surface of foundation pile 13 when stab and hinge-over PLET 19 is hinged-over to the landed position.

A locking mechanism 41 is preferably attached to the end portion of base frame 21 opposite from stab 23. Locking mechanism 41 is preferably operable between a closed or locked position shown in FIG. 5 and an open or unlocked position shown in FIG. 4. Locking mechanism 41 slides from the unlocked position to engage foundation pile 13 in order to secure stab and hinge-over PLET 19 to foundation pile 13 against rotating upward toward a vertical orientation about pin 24 when stab 23 is within stab receptacle 27.

Locking mechanism 41 preferably includes a latch member 43 that slides radially inward and outward relative to foundation pile 13. Latch member 43 is preferably located below base frame 21. Latch member 43 is preferably connected to an end of an actuation rod 45. The other end of actuation rod 45 is preferably connected to an actuation block 46 that is carried within a lock guide 47. As actuation block 46 travels upward within lock guide 47, actuation rod 45 pulls latch member 43 to the unlocked position. Actuation rod 45 pushes latch member 43 to the locked position when actuation block 46 travels downward within lock guide 47. In the preferred embodiment, actuation block 46 is moved upward and downward by ROV 20. Each end of actuation rod 45 is preferably pivotally connected to latch member 43 and actuation block 46 so that the upward and downward movement of actuation block 46 within lock guide 47 translates to the radially inward and outward movement of latch member 43.

In the preferred embodiment, sliding mechanism 25 includes a piping flange 49 positioned on a support base 51. Piping flange 49 connects to an outer surface of pipeline 17 being received by stab and hinge-over PLET 19 so that sliding mechanism 25 moves in response to the longitudinal contraction and expansion of pipeline 17. In the preferred embodiment, piping flange 49 is axially aligned with the axis of the portion of pipeline 17 at the end of stab and hinge-over PLET 19.

As best shown in FIG. 6, each beam 35 has an upward facing surface 53 that defines a track 54 upon which sliding mechanism 25 travels. In the preferred embodiment, beams 35 are J-beams, and upward facing surface 53 is on the lower cross-member of the I-beam, and the upper cross-member can help retain sliding mechanism 25. As will be readily appreciated by those skilled in the art, upward facing surface 53 can be located at various positions on beams 35. For example, the upward facing surface could alternatively be on top of the upper cross-member of the I-beam, or it could be any upward facing surface on another form of beam 35. Sliding mechanism 25 preferably includes a plurality of blocks 55 that engage upward facing surface 53. Blocks 55 preferably extend outward from the sides of support base 51 and rest upon upward facing surface 53. When beams 35 are J-beams such as those shown in FIG. 6, blocks 55 can be carried on upward facing surface 53 between the upper and lower cross-members.

When stab and hinge-over PLET 19 is being lowered to foundation pile 13, it is preferable that sliding mechanism 25 is secured relative to base frame 21. Tie-down cables or straps 57 extend between eye bolts 59,61 that are respectively located on sliding mechanism 25 and base frame 21 in order to help secure sliding mechanism 25 relative to base frame 21 from moving toward stab 23. Stoppers can also be positioned in track 54 in order to secure sliding mechanism relative to base frame 21 from moving away from stab 23. Such stoppers can also be used to define the stroke of sliding mechanism 25.

Referring back to FIGS. 4-6, sliding mechanism 25 preferably includes a tower assembly 63 between piping flange 49 and stab 23. Tower assembly 63 extends upward from support base 51. In the preferred embodiment, a plurality of tower rods 65 extends upward from support base 51, with a plurality of cross-members 67 creating a lattice support for tower assembly 63. The end of tower assembly 63 adjacent to piping flange 49 is preferably free of cross-members 67 in order to receive pipeline 17. Tower assembly 63 has a collet 69 positioned at its upper end for connection with a pipeline end 71 of pipeline 17. Tower assembly 63 receives pipeline 17 and redirects pipeline 17 from extending substantially parallel with support base 51 when passing through piping flange 49, to extending substantially perpendicular to support base 51 at the connection with collet 69. Such redirection causes a curvature C to be formed in pipeline 17. Such orientation is preferable for facilitating connection of other elements (not shown) to pipeline 17.

Figure 7:
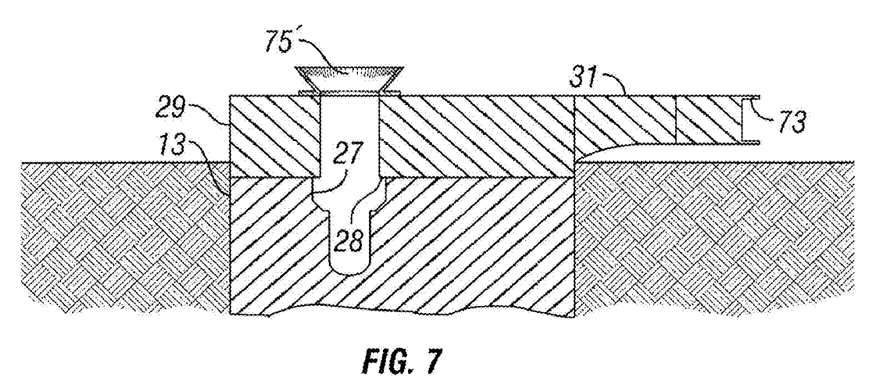
FIG. 7 is a sectional view of the foundation of FIG. 1 embedded into the sea floor.
Figure 8:
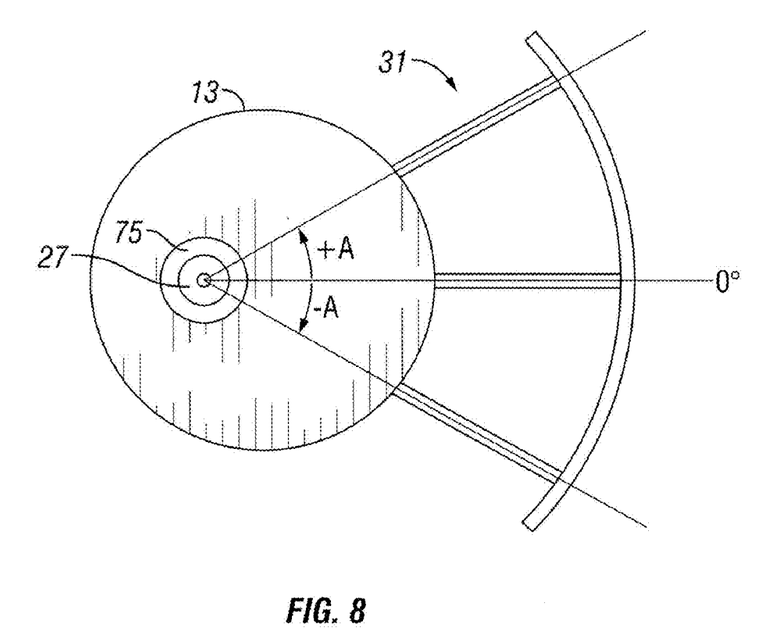
FIG. 8 is a top plan view of the foundation of FIG. 1.

Referring to FIGS. 7 and 8, foundation pile 13 is shown embedded in sea floor 15. Foundation deck 31 can be seen extending radially outward from an arcuate side portion of foundation pile 13. In the preferred embodiment, foundation deck 31 has a downward facing lip 73 located along the periphery of foundation deck 31. Downward facing lip 73 is engaged by latch 43 (FIG. 9C) when stab and hinge-over PLET 19 is landed and locked onto foundation pile 13.

As is perhaps best shown in FIG. 8, foundation deck 31 preferably extends around an arcuate portion of foundation pile 13, rather than around the entire circumference of foundation pile 13. The angle of arcature is plus or minus an angle A from the angular midpoint of foundation pile 13, designated as zero degree (0°), extending from stab receptacle 27. In the preferred embodiment, angle A is about fifteen degrees (15°). The arcuate arrangement of foundation deck 31 allows for less stringent rotational alignment of stab and hinge-over PLET 19 when being landed.

A funnel guide 75,75' can also be included at the upper end of stab receptacle 27 for aiding in the reception of stab 23. Funnel guide 75 (FIGS. 2-3 and 9A-9C) is a funnel-shaped portion of stab receptacle 27 that can part of the bore of stab receptacle 27, or alternatively funnel guide 75' (FIG. 7) can be a funnel member attached to the upper surface of foundation pile 13 above stab receptacle 27.

In operation, stab and hinge-over PLET 19 is lowered by vessel 11 toward foundation pile 13 as shown in FIGS. 1 and 2. Stab 23 will naturally be oriented downward due to gravity. ROV 20 can be used for final orientation of stab 23 with stab receptacle 27. The operator then lowers stab and hinge-over PLET 19 so that stab 23 is received within stab receptacle 27 to the position shown in FIGS. 9A-9C. While traveling through stab receptacle 27, latch plates 26 are tilted upward by the bore of stab receptacle 27. Upon passing beyond downward facing shoulder 28, latch plates 26 rotate radially outward to a position in which the upper portion of latch plates 26 engage downward facing shoulder 28 if stab 23 is pulled upward.

Figure 9A:
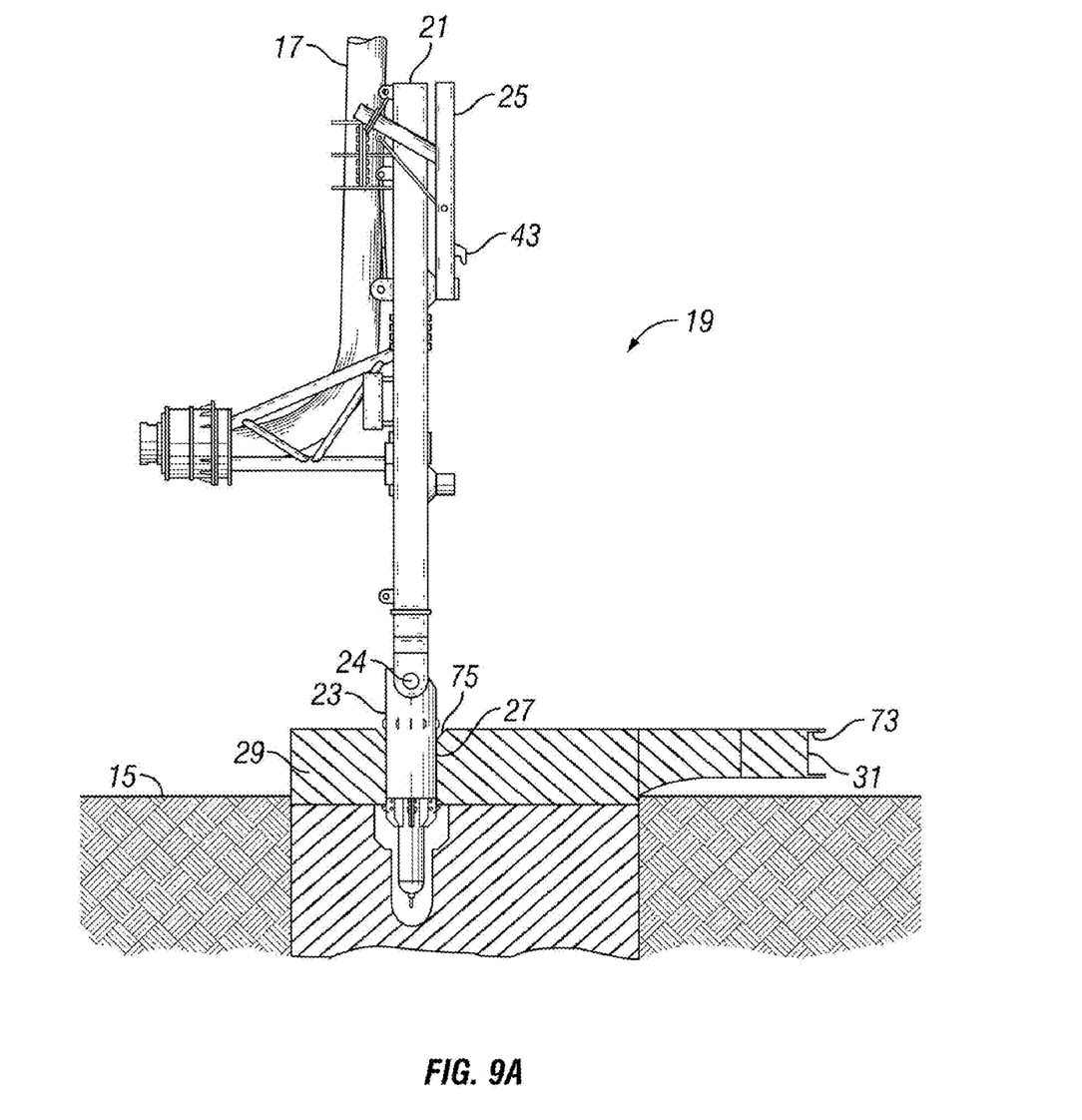
FIGS. 9A-9C are sequential, schematic views of the pipeline end terminal assembly of FIG. 1 being landed onto the foundation.
Figure 9B:
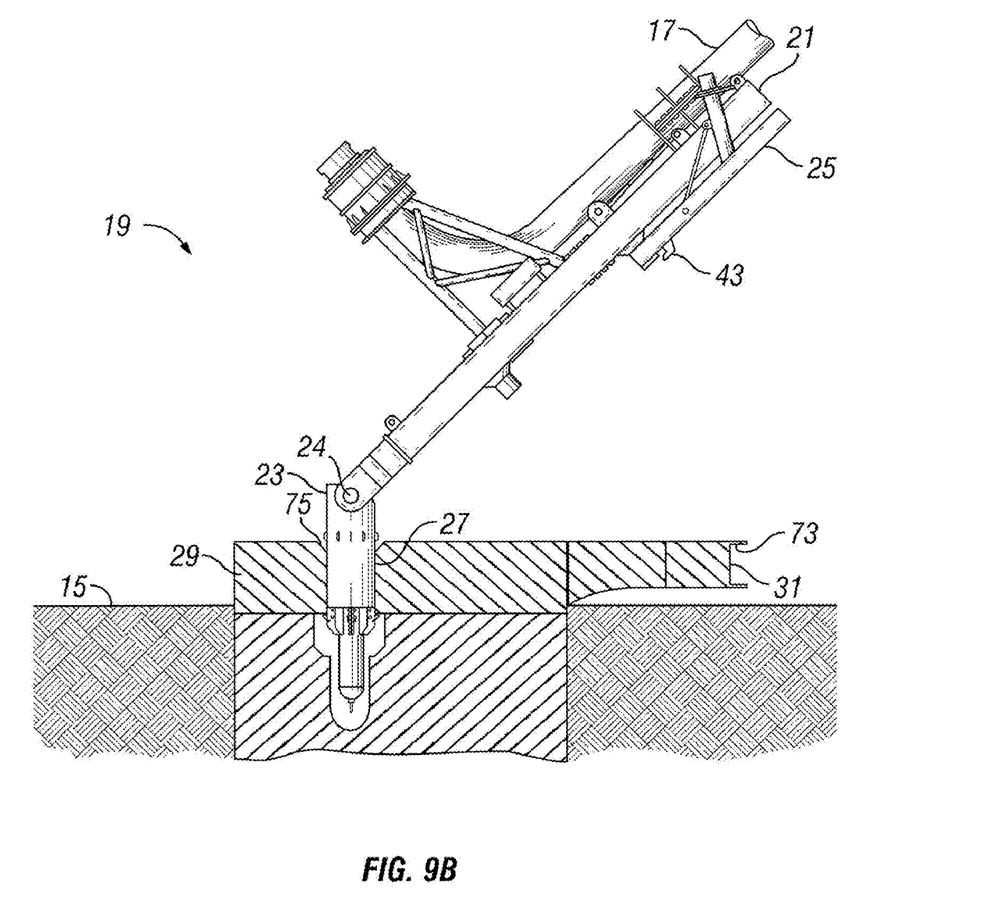
Figure 9C:
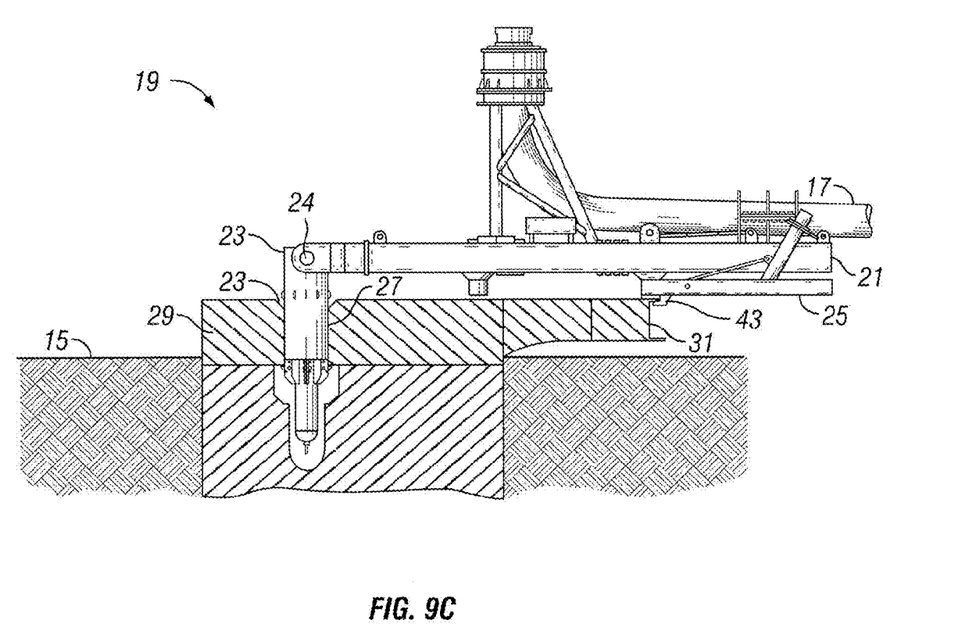

Latch 43 is preferably in the unlocked position. Vessel 11 then moves in the direction that pipeline 17 is going to be laid while lowering at least one additional segment of pipeline 17 in order to cause base frame 21 to rotate or hinge-over about pin 24 to foundation deck 31, as shown in FIGS. 9B and 9C. ROV 20 moves actuation block 46 downward within lock guide 47. Thereby causing actuation rod 45 to push latch 43 toward the locked position. When in the locked position (FIG. 9C), latch 43 engages downward facing lip 73 of foundation pile 13, thereby securing stab and hinge-over PLET 19 from rotating or hinging back over stab 23 if pipeline expands and pushes toward stab 23.

ROV 20 is used to remove tie-down cables or straps 57 so that sliding mechanism 25 is free to move with pipeline 17 relative to base frame 21 in response to the expansion and contraction of pipeline 17. Typically, pipeline 17 will first expand once the hot hydrocarbons are flowing through the cold sea water adjacent sea floor 15, thereby causing sliding mechanism 25 to move along track 54 toward stab 23. When the flow of hydrocarbons is stopped, pipeline 17 cools, thereby causing pipeline 17 to contract. During this contraction, pipeline 17 pulls sliding mechanism 25 away from stab 23. In the preferred embodiment, sliding mechanism 25 is positioned near its most distant point away from stab 23 while pipeline 17 is being laid because pipeline 17 will not contract much further than this already cold-state for pipeline 17.

While the invention has been shown in only some of its forms, it should be apparent to those skilled in the art that it is not so limited, but susceptible to various changes without departing from the scope of the invention. For example, blocks 55 can easily be replaced with rollers that roll along tract 54 rather than sliding across its surface.

That claimed is:

1. A subsea system for securing an end portion of a pipeline, comprising:
    a subsea foundation having a lower portion located below the sea floor and an upper portion extending above the sea floor, the subsea foundation having a receptacle formed in the upper portion;
    a base frame that lands on the subsea foundation, the base frame having a track formed therein;
    a stab hingedly mounted to the base frame, the stab stabbing into the receptacle to secure the base frame to the subsea foundation; and
    a sliding mechanism carried by the base frame and moveable along the track, the sliding mechanism being connected to a segment of the pipeline extending along the sea floor and configured to slide along the track responsive to lateral movements of the pipeline due to heating and cooling of the pipeline.

2. The subsea system according to claim 1, wherein the subsea foundation comprises a suction pile.

3. The subsea system according to claim 1, wherein the stab is connected to an end portion of the base frame and the base frame pivots about the stab to engage the upper portion of the subsea foundation after the stab stabs into the receptacle.

4. The subsea system according to claim 3, wherein the upper portion of the subsea foundation comprises a reinforced section resistant to shear forces.

5. The subsea system according to claim 1, wherein the stabbing of the stab into the receptacle secures the base frame against horizontal movement relative to the subsea foundation.

6. The subsea system according to claim 1, wherein the subsea foundation further comprises a foundation deck cantileverly mounted to the upper portion of the subsea foundation, the foundation deck supporting at least a portion of the base frame when the base frame lands on the subsea foundation.

7. The subsea system according to claim 6, wherein the base frame further comprises a locking mechanism, the locking mechanism being selectively extendable into engagement with the foundation deck.

8. The subsea system according to claim 6, wherein the stab is connected to an end portion of the base frame and the base frame pivots about the stab so that at least a portion of the base frame engages the foundation deck after the stab stabs into the receptacle.

9. The subsea system according to claim 8, wherein the base frame further comprises a locking mechanism, the locking mechanism being selectively extendable into engagement with the foundation deck in order to secure the base frame against vertical movement relative to the foundation deck when the base frame has pivoted about the stab and a portion of the base frame is engaging the foundation deck.

10. A terminal assembly for an end portion of a pipeline, comprising:
    a base frame adapted to land onto a subsea foundation, the base frame having a track formed therein;
    a stab hingedly mounted to the base frame, the stab being adapted to be received within a stab receptacle formed in the subsea foundation; and
    a sliding mechanism carried by the base frame and moveable along the track, the sliding mechanism being adapted to connect to a segment of the pipeline extending along the sea floor and to move in response to forces from the pipeline due to heating and cooling of the pipeline.

11. The terminal assembly according to claim 10, wherein the track extends longitudinally relative to the base frame.

12. The terminal assembly according to claim 10, wherein the base frame further comprises a rail with an upward facing surface, the upward facing surface defining a lower portion of the track.

13. The terminal assembly according to claim 10, wherein the base frame further comprises a pair of spaced-apart rails, each of the rails having an upward facing surface defining a lower portion of the track.

14. The terminal assembly according to claim 10, wherein the sliding mechanism further comprises a support that slidingly engages the track and a piping flange positioned thereupon, the piping flange being adapted to circumferentially extend around the end portion of the pipeline so as to connect the end portion of the pipeline to the sliding mechanism and to transfer forces from the pipeline to the support to thereby cause the support to slide relative to the track.

15. The terminal assembly according to claim 14, wherein the sliding mechanism further comprises a tower frame and tower flange arrangement extending from the support, which is adapted to redirect the pipeline from extending substantially horizontally through the pipeline flange to extending substantially vertically when connecting with the tower flange.

16. The terminal assembly according to claim 10, wherein the base frame further comprises a locking mechanism, the locking mechanism being adapted to selectively extend into engagement with the subsea foundation.

17. The terminal assembly according to claim 10, wherein the stab further comprises a plurality of plates that are outwardly biased and adapted to engage a portion of the interior surface of the stab receptacle when the stab stabs into the stab receptacle in order to resist vertical movement of the stab relative to the stab receptacle.

18. A method for securing an end portion of a pipeline, comprising:
  (a) installing a subsea foundation in the a sea floor with a lower portion of the subsea foundation being below the sea floor and an upper portion extending above the sea floor;
  (b) stabbing a stab that is hingedly mounted to a base frame into a receptacle formed in the upper portion of the subsea foundation to secure the base frame to the subsea foundation;
  (c) landing the base frame onto the subsea foundation;
  (d) carrying a sliding mechanism with the base frame that moves along a track of the base frame;
  (e) connecting the sliding mechanism to a segment of a pipeline extending along the sea floor; and
  (f) moving the sliding mechanism in response to forces from the pipeline due to heating and cooling of the pipeline.

19. The method according to claim 18, wherein in step (b) the stab is connected to an end portion of the base frame, and step (c) further comprises hinging-over the base frame about the stab to engage the upper portion of the subsea foundation.

20. The method according to claim 18, wherein step (a) further comprises providing a foundation deck cantileverly mounted to the upper portion of the subsea foundation, and step (c) further comprises landing at least a portion of the base frame onto the foundation deck.

21. A subsea system for securing an end portion of a pipeline, comprising:
  a subsea foundation having a lower portion located below the sea floor and an upper portion extending above the sea floor, the subsea foundation having a receptacle formed in the upper portion;
  a base frame that lands on the subsea foundation, the base frame having a track formed therein;
  a stab hingedly mounted to the base frame, the stab stabbing into the receptacle to secure the base frame to the subsea foundation; and
  a sliding mechanism carried by the base frame and moveable along the track, the sliding mechanism being connected to a segment of the pipeline extending along the sea floor,
  wherein the subsea foundation further comprises a foundation deck cantileverly mounted to the upper portion of the subsea foundation, the foundation deck supporting at least a portion of the base frame when the base frame lands on the subsea foundation.

22. The subsea system according to claim 21, wherein the base frame further comprises a locking mechanism, the locking mechanism being selectively extendable into engagement with the foundation deck.

23. The subsea system according to claim 21, wherein the stab is connected to an end portion of the base frame and the base frame pivots about the stab so that at least a portion of the base frame engages the foundation deck after the stab stabs into the receptacle.

24. The subsea system according to claim 23, wherein the base frame further comprises a locking mechanism, the locking mechanism being selectively extendable into engagement with the foundation deck in order to secure the base frame against vertical movement relative to the foundation deck when the base frame has pivoted about the stab and a portion of the base frame is engaging the foundation deck.

* * * * *